H. H. BATES.
TRACTOR.
APPLICATION FILED NOV. 7, 1917. RENEWED OCT. 13, 1921.
1,406,332.
Patented Feb. 14, 1922.
7 SHEETS—SHEET 2.
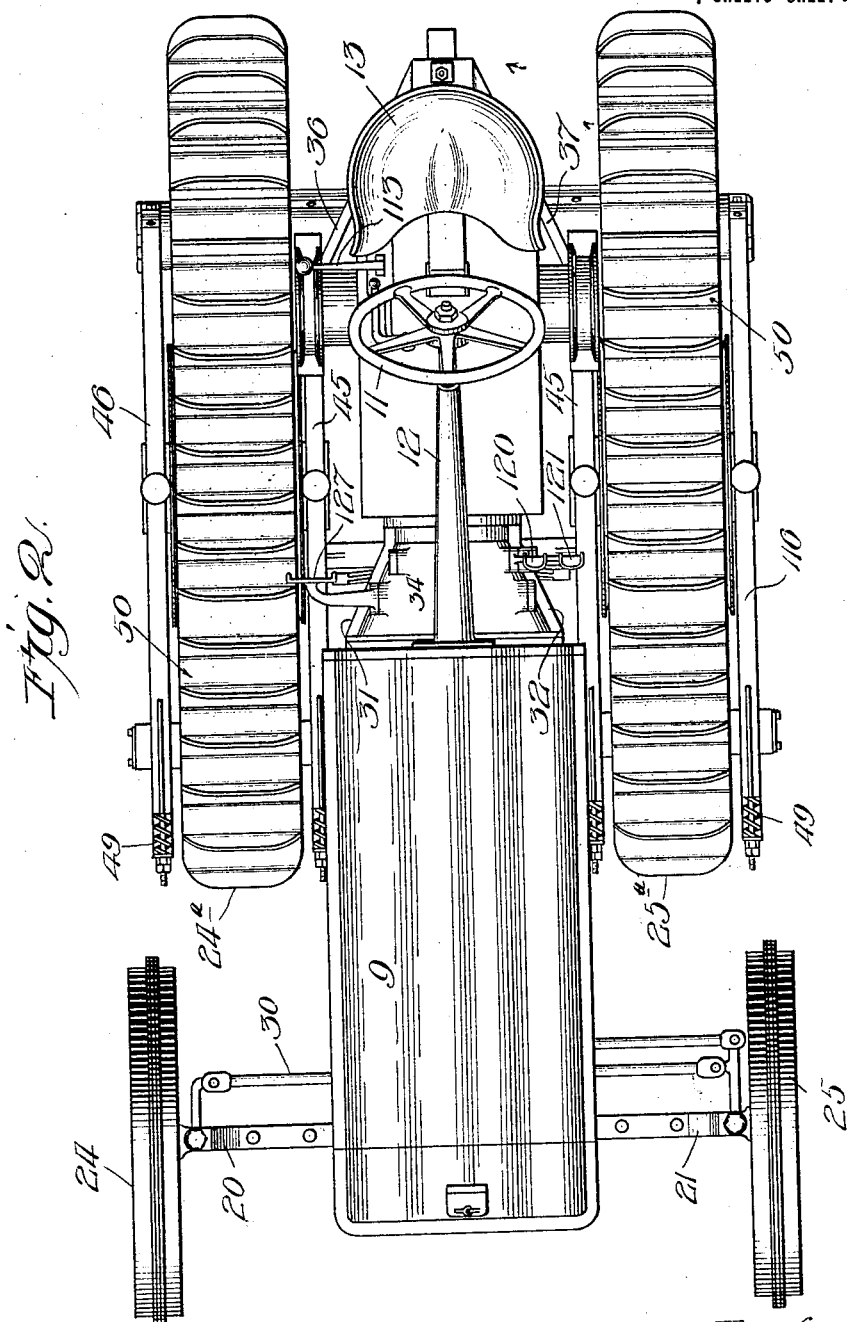

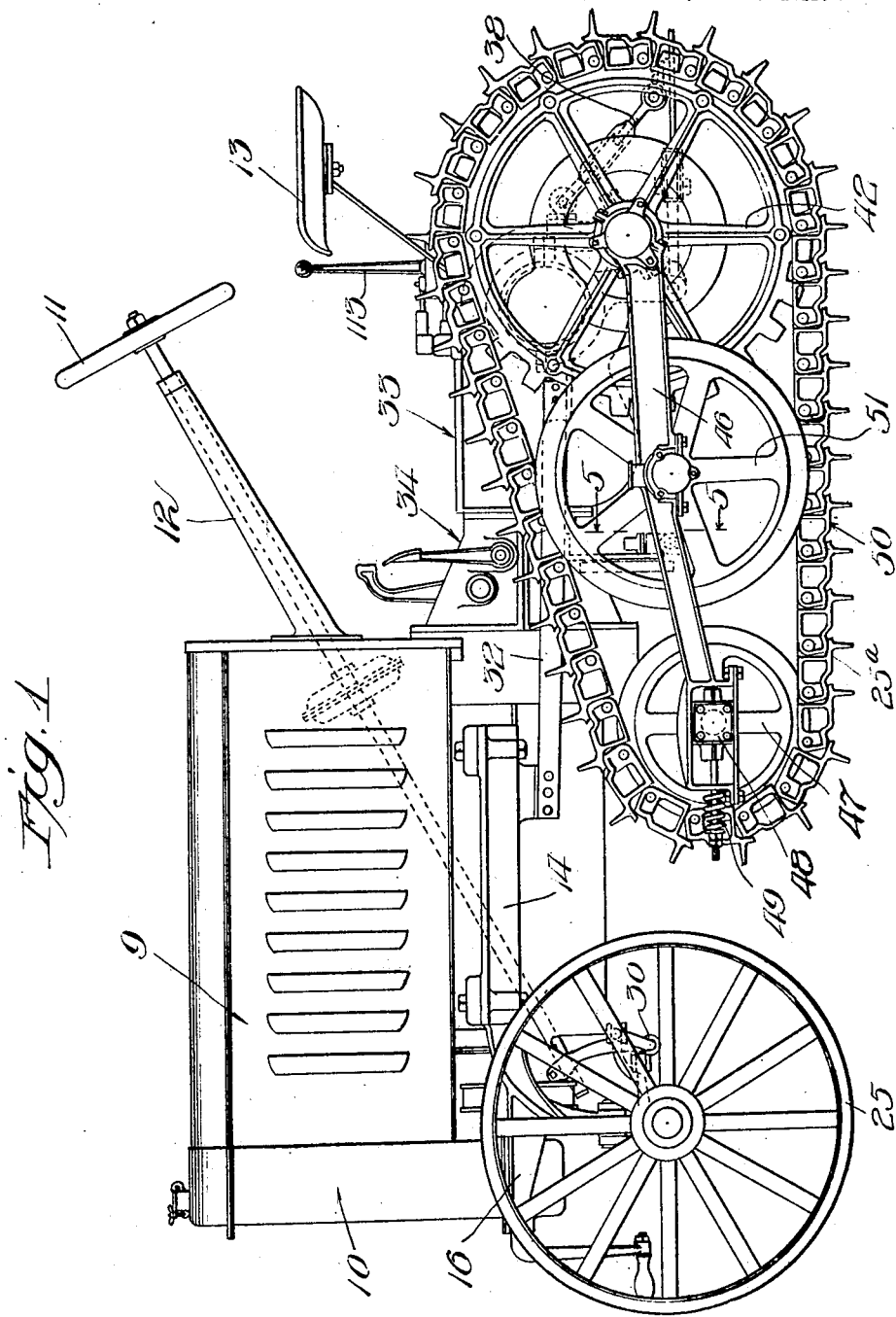

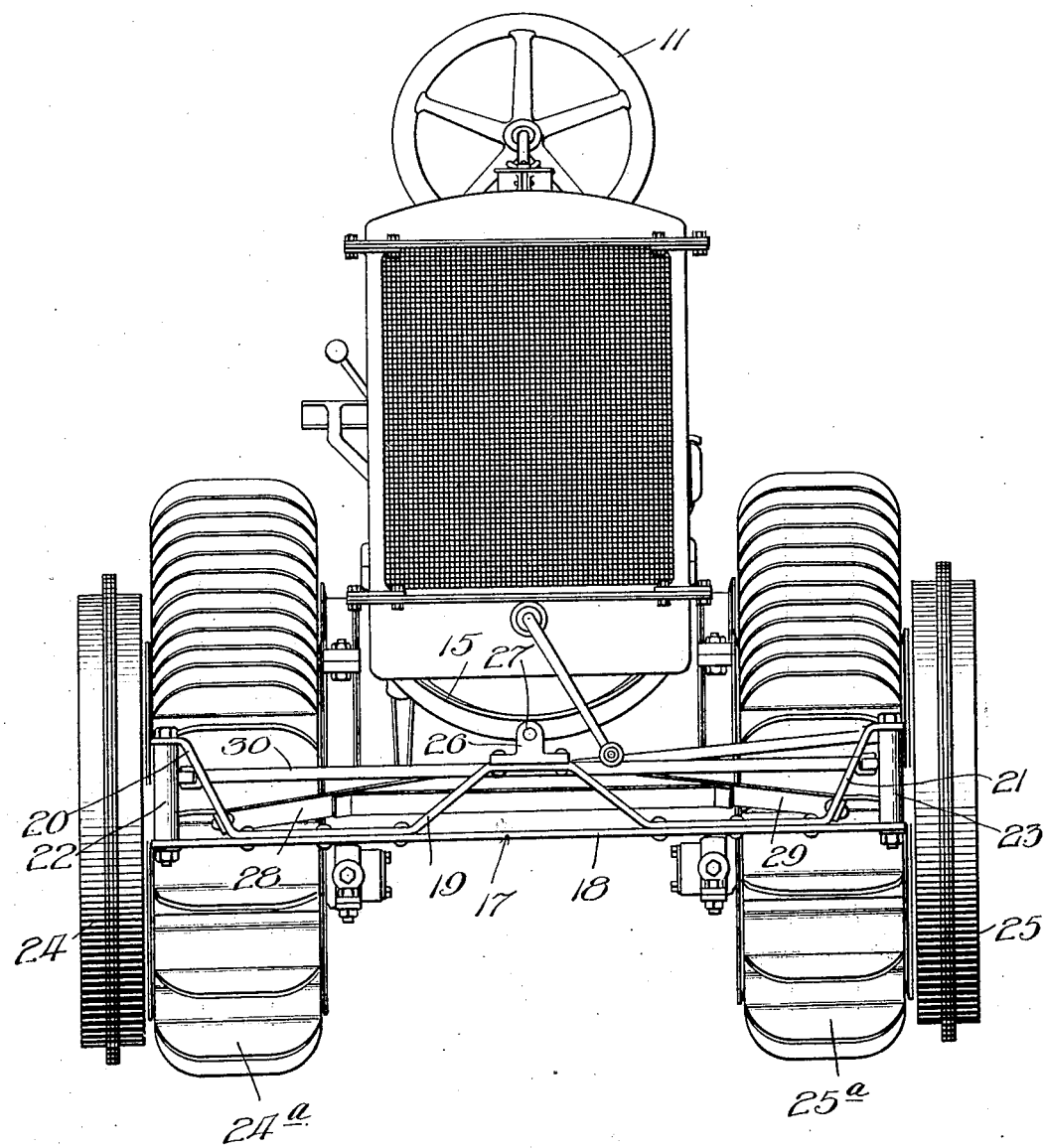

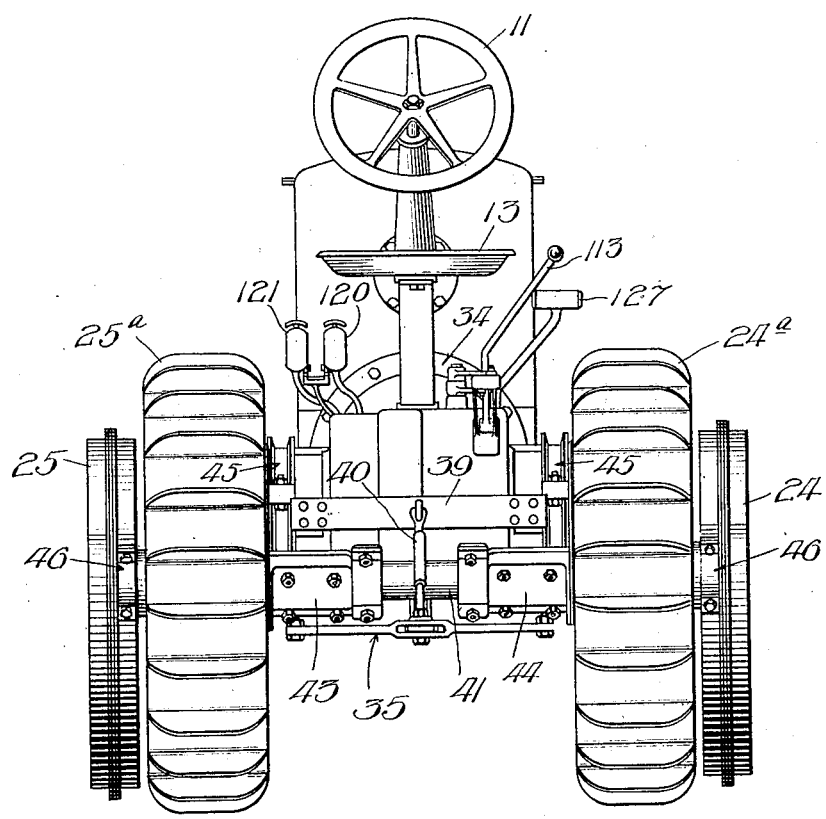

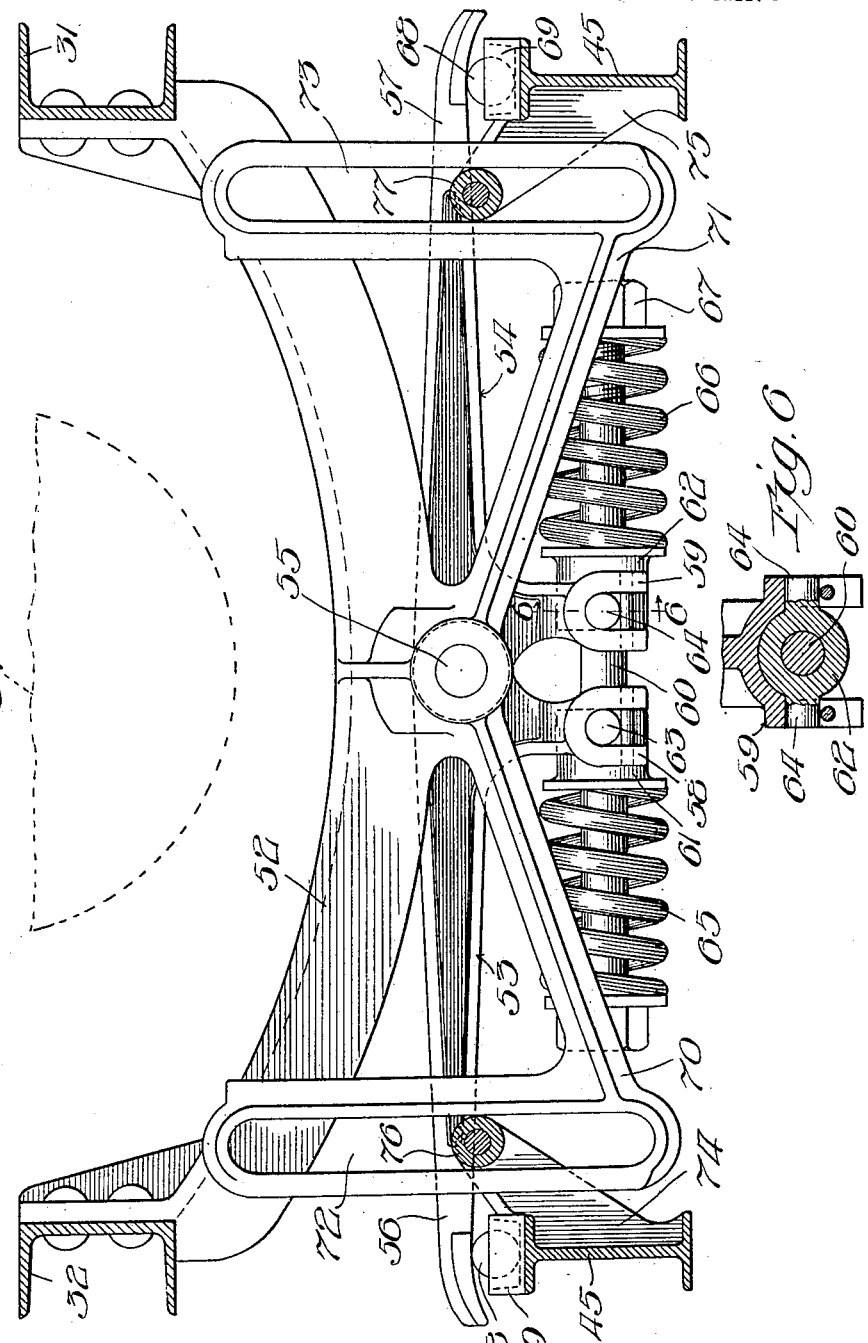

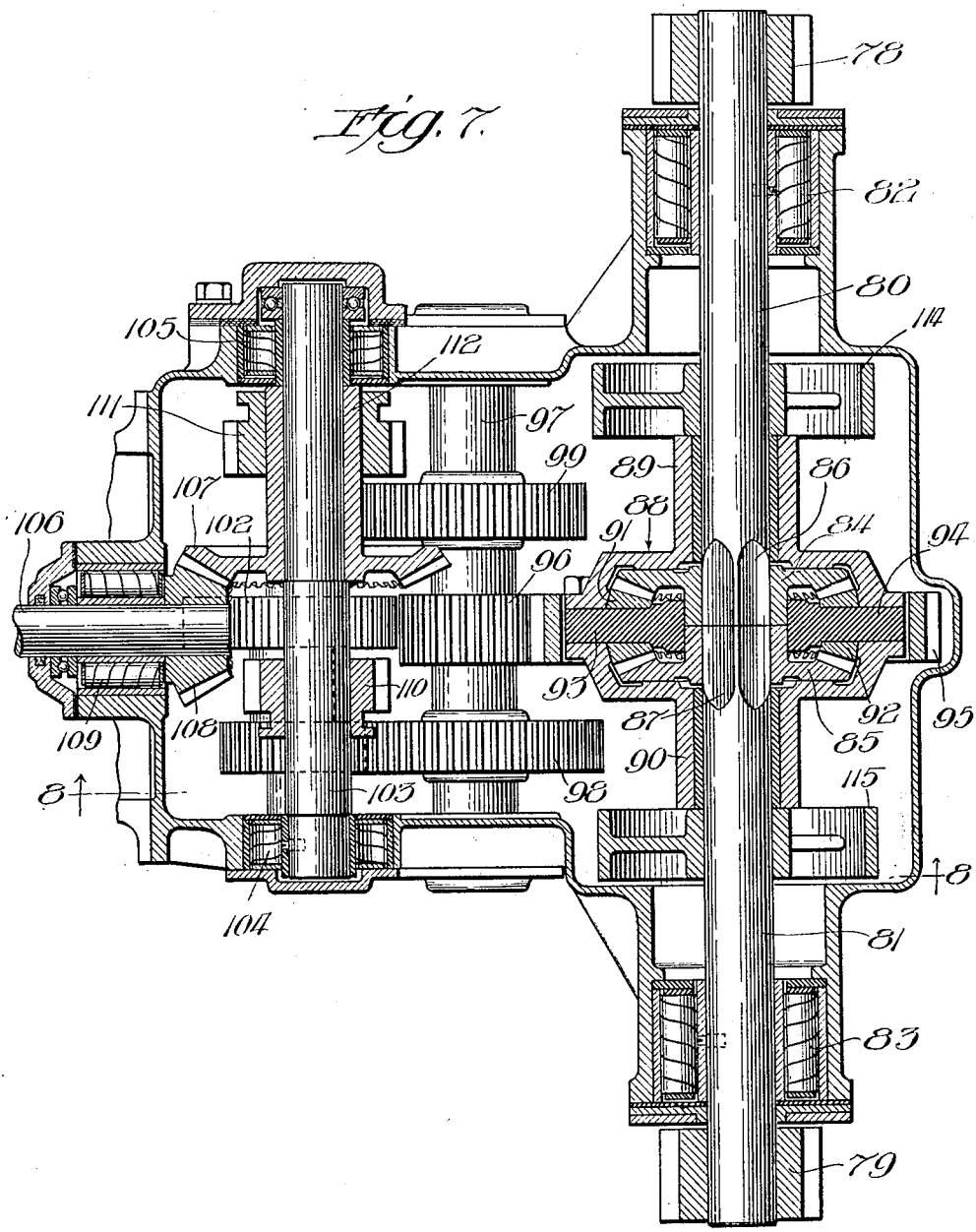

H. H. BATES.
TRACTOR.
APPLICATION FILED NOV. 7, 1917. RENEWED OCT. 13, 1921.

1,406,332.

Patented Feb. 14, 1922.
7 SHEETS—SHEET 7.

Witness:
Harry S. Gaither

Inventor:
Harry H. Bates
by
Atty's

UNITED STATES PATENT OFFICE.

HARRY H. BATES, OF JOLIET, ILLINOIS, ASSIGNOR TO BATES MACHINE & TRACTOR COMPANY, OF JOLIET, ILLINOIS, A CORPORATION OF DELAWARE.

TRACTOR.

1,406,332. Specification of Letters Patent. Patented Feb. 14, 1922.

Application filed November 7, 1917, Serial No. 200,696. Renewed October 13, 1921. Serial No. 507,569.

*To all whom it may concern:*

Be it known that I, HARRY H. BATES, a citizen of the United States, residing at Joliet, in the county of Will and State of Illinois, have invented certain new and useful Improvements in Tractors, of which the following is a specification.

The present invention has to do with certain improvements in tractors, and particularly has reference to improvements in tractors intended for agricultural work and the like. It will appear, however, that the features of invention are nowise limited to this particular class of work, although certain of the said features are particularly beneficial when so applied. I will, therefore, state at this point that the machine herein disclosed has been laid out with particular reference to the requirements of an agricultural tractor and also the requirements of such a machine for use in connection with agricultural implements such as plows and the like.

In operating a tractor through the field, especially on the side of a hill, account must be taken of the side draft of a plow tending to pull the tractor down the hill and, therefore, over into the furrow. This side draft is a very serious and important item and makes it very difficult to steer the tractor so as to properly plow fields located on sides of hills unless this side draft is practically eliminated in such a manner as not to interfere with either the traction or the stability of the tractor, and unless the steering or guiding mechanism is so arranged that the tractor may be kept substantially in a straight line.

Hitherto, when four wheel tractors have been used for this purpose, having both front and rear wheels running on the unplowed ground so that the drivers secure maximum traction, it has been found that the side draft of the plow, combined with the slope of the hill caused the driving wheel on the furrow side to keep slipping off the unplowed ground, into the furrow and thus interfering with the plowing operation.

When this type is hitched to the plow so that both one front wheel and one driver runs in the furrow while the other wheels run on the unplowed ground, the depth of the furrow, added to the slope of the land, causes the tractor to tilt over at such an angle that most of the weight is thrown onto the driver running in the furrow which takes the weight off the other driver and thus decreasing its traction, also interfering with the plowing operation.

If this four wheel type tractor is so constructed that the two front wheels run in the furrow and follow the furrow wall so as to facilitate in guiding the tractor and at the same time the two driving wheels are brought close together so as to run on the unplowed ground and allow the plow to be attached so that there is no side draft, there is so much distance between the front wheels and the corresponding drive wheels that the slope of the hill allows the rear end of the tractor to creep down and get into the furrow. When this drive wheel slides down into the furrow, it cannot get back up on the plowed ground again without making a detour which interferes with the plowing operation.

Other types of tractors, consisting of two endless chain treads or crawlers, constructed either without any steering wheels whatever or steering wheels so located that they run on the unplowed ground are difficult to guide and require so much undivided attention of the operator that he cannot attend to the plows when moving, which also interferes with the plowing operation.

One of the objects of this invention is to so construct a tractor that it may be easily operated by having a steering means follow the furrow wall so that the tractor may be easily guided in a straight line with a minimum of attention and at the same time to have two driving members running on the unplowed ground and constructed with a long line of contact, parallel to the centre line of the machine, with their front ends close up to the guiding means. With such a construction the plows may be attached so that there is no side draft and the tractor may be easily guided in plowing on side hills. Should the rear end of the tractor creep down hill, the long length of the driving means having one end located close to the steering means assures at least one section of the down hill driver being always on the unplowed ground, and, therefore, the tractor may continue forward without a detour and the plowing continue without interruption.

One of the objects of the present invention is to so construct a tractor, and to so relate the traction elements to the steering wheels that it will be possible to obtain both of the benefits enumerated above. That is to say, it will be possible to obtain the benefit of a steering wheel traveling in the previously cut furrow in combination with the benefit of having all of the traction elements travel on the land-side.

At this point, I will mention that in the particular arrangement shown in the drawings, both of these benefits are secured by setting the steering wheels at a greater distance apart than the overall width of the traction element, so that the steering wheels will track outside of the traction elements. In this way, it is possible to have one of the steering wheels travel in the previously cut furrow, while having all of the traction elements riding on the land.

Another object is to construct a tractor so that not only will it be substantially a self-guiding tractor when used for plowing, but can, without any change, be successfully used for pulling implements on plowed ground without seriously packing the soil while traveling over it, and when pulling the implements turn in a shorter radius than it could if it depended for its guiding actions on the steering wheels alone.

Hitherto on tractors which were used for this operation either crawler type tractors were used, so made that they would turn short and not injuriously pack the soil, but lacking the self-guiding feature when used for plowing, or round wheel tractors were used which were self-guiding when used for plowing, and so made that they could turn short when used on plowed ground, but because of the limited area of the drive wheels on the ground, made a large pressure per square inch of surface which injuriously packs the soil.

By having steering wheels which track outside of the traction elements, I am able to make a tractor which is prctically self-guiding when used for plowing substantially as above described, and having a crawler type driving mechanism with a large area in contact with the ground having a machine with a low pressure per square inch of surface which will not injuriously pack the soil, and by locking one of the crawlers against rotation, or at any rate, reducing its speed, it can turn short on plowed ground and any of said operations can be successfully accomplished without any additions or subtraction of parts to or from the tractor.

Other object and uses of the invention will appear from a detailed description of the same which consists in the features of construction and combination of parts hereinafter described and claimed.

Referring to the drawings:

Figure 1 shows a side elevation of a tractor embodying the features of the present invention;

Fig. 2 shows a plan view corresponding to Fig. 1;

Fig. 3 shows a front elevation of the tractor;

Fig. 4 shows a rear elevation of the tractor;

Fig. 5 shows a fragmentary cross section taken substantially on the line 5—5 of Fig. 1, looking in the direction of the arrows;

Fig. 6 shows a fragmentary cross section taken on the line 6—6 of Fig. 5, looking in the direction of the arrows;

Fig. 7 shows a horizontal section through the transmission gearing; and

Figure 8:
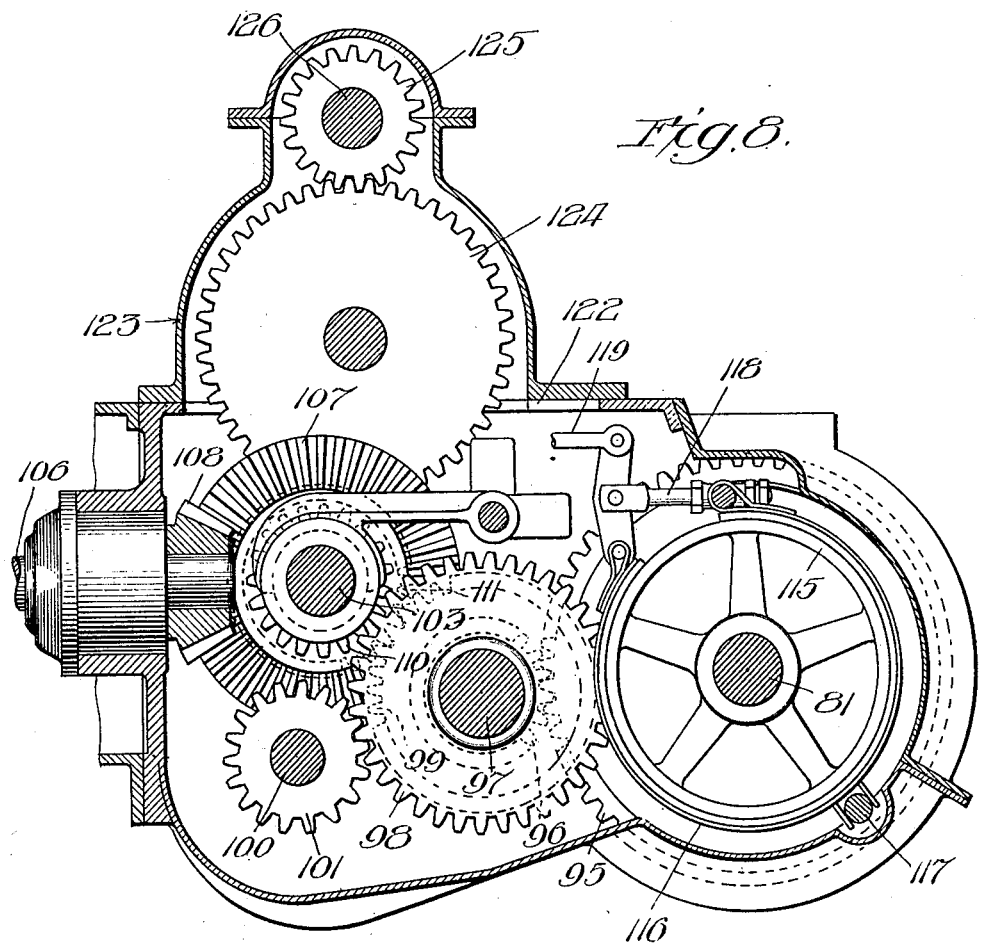
Fig. 8 shows a vertical section taken on the line 8—8 of Fig. 7, looking in the direction of the arrows.

Referring to the drawings, I will explain, in the first place, that, while I have therein shown a particular embodiment of the features of invention, still I do not limit myself to the said embodiment, except as I may do so in the claims.

In this embodiment of the invention, the engine is located within a hood or casing 9 at the front end of which is the radiator 10. The steering wheel 11 is conveniently carried by the rearwardly slanting post 12 and stands in position for convenient manipulation by the operator seating on the driver's seat 13. This arrangement is a very convenient one from the standpoint of ease of control, and, furthermore, it resembles the approved practice in many forms of automobile construction.

The frame of the machine includes a pair of side bars 14 underneath the sides of the engine (only one of said bars appearing in Fig. 1). The front portions of these bars are connected together by a yoke or saddle 15 which appears in front elevation in Fig. 3, the brackets 16 extending forwardly from said saddle and supporting the radiator. To the lower portion of the saddle 15 is connected the front axle 17. This front axle is conveniently built up from the lower flat bar 18 which extends straight across, and the upper flat bar 19 which is bent in the form clearly shown in Fig. 3. The end portions of the bar 19 are bent up as shown at 20 and 21 so as to accommodate the yokes 22 and 23 for the spindles of the front wheels 24 and 25. The central portion of the bar 19 is also bent up and carries the bracket 26 which is pinned to the central part of the saddle 15 by a horizontal pin 27, as shown in Fig. 3. This arrangement permits the front axle and the frame of the machine to tilt with respect to each other about a longitudinal horizontal axis. Brace rods or bars 28 and 29 extend rearwardly from the end portions of the front axle 17 and steady the same so as to keep it in line. The reach rod 30 connects together the steering yokes of the front wheels in the manner well understood in the art. The steering wheel 11 is operatively connected to the front wheels in a manner which is also well understood in the art, and I will not further describe these parts in detail.

Extending rearwardly from the frame bars 14 are the side bars 31 and 32. These side bars carry or are connected to the gear shifting box 33 and the clutch box 34. The construction of certain of these parts will be explained more in detail presently. A draft bar 35 is mounted in the rear portion of the machine. It is of V-shaped formation, having its ends 36 and 37 connected to the frame of the machine in any suitable manner. A tension rod 38 slants downwardly from the central portion of a cross bar 39 to the central portion of the draft bar 35 and serves to support the draft bar at the proper elevation. A turn buckle 40 serves as a convenient means for adjusting this tension rod 38 to the exact length desired.

Across the rear portion of the machine extends an axle 41 on the ends of which are mounted the crawler wheels 42. The axle 41 is connected to the frame by the boxes 43 and 44, as illustrated in Fig. 4. Ordinarily the wheels 42 will be journaled on the end portions of the axle 41, so that it is not necessary for the axle to rotate, but, in some cases, the boxes 43 and 44 may be constructed as journal boxes so as to permit rotation of the axle. In order, however, to secure the differential action presently to be explained between the two crawlers, it is desirable that the wheels 42 should be journaled on the axle.

Reaching forward from each end of the axle 41 is a pair of reach bars 45 and 46. These reach bars operate in pairs, and for this purpose, they may be joined together in any suitable manner. Each bar is journaled or pivoted on the axle 41, so that its forward end may swing up and down, thereby permitting the crawlers to ride over inequalities or irregularities in the surface of the ground. A wheel 47 is journaled between the front portions of each pair of arms 45 and 46. For this purpose, the forward ends of said arms are slotted or bifurcated to receive the journal boxes 48 for the wheels 47, which journal boxes may slide back and forth. Springs 49 draw the journal boxes forward with respect to the arms 45 and 46 so as to hold the wheels 47 forwardly under spring tension.

A crawler chain 50 travels over the wheels 42 and 47 at each side of the machine. Manifestly the springs 49 will maintain the crawler chains under tension at all times, and by regulating the stiffness of these springs and the amount of their compression, it is possible to maintain the desired amount of tension in the crawler chains. In those cases where the length of the crawler is such that full advantage will not be taken of the area which it presents to the ground, an additional idler wheel 51 may be journaled to the arms 45 and 46 so as to throw pressure onto the central portion of the crawler chain. In fact it will generally be found desirable to use an idler pinion or wheel of this type. The driving of the crawler chain is ordinarily accomplished through the medium of the wheels 42. These wheels are, therefore, generally constructed as sprocket wheels engaging the links of the crawler chains. The wheels 47 and 51 may or may not be sprocket wheels depending upon the wishes of the designer, inasmuch as they simply serve to guide the travels of the chains.

With the arrangement as thus far described, that portion of the load carried by the crawler would be transmitted entirely through the medium of the wheels 42. Inasmuch as these wheels are located at the rear ends of their respective crawlers, it follows that this arrangement would give only a comparatively small pressure on the front portions of the crawler chains, and, consequently, full advantage could not be taken of the crawler construction for distributing the load on the surface of the ground.

I have, therefore, provided means for directly transmitting a desired portion of the weight of the frame to the forward portions of the crawler chains so as to thereby distribute the loads and pressures. At the same time I have provided means for equalizing the pressures on the two sides of the machine so as to make it possible for the two crawlers to swing or adjust themselves independently of each other according to the irregularities on the surface of the ground at the two sides of the machine. These constructions I will now explain more in detail. Reference to Fig. 5 shows the presence of the frame bars 31 and 32 to which reference has previously been made. A saddle bar 52 has its end portions connected to the frame bars 31 and 32 at a point well forward with respect to the lengths of the oscillating bars 45 and 46. This saddle bar preferably curves downwardly, as shown in Fig. 5, so as to clear the transmission and clutch boxes which are supported above it. To the central portion of the saddle bar are pivoted bell cranks 53 and 54 on the pin 55. The long arms 56 and 57 of these bell cranks are supported by the oscillating bars 45 of the crawler frames. The short arms 58 and 59 of these bell cranks extend downwardly at points adjacent to each other, a pin 60 extending through these short arms, as shown in Figs. 5 and 6. The sleeves 61 and 62 mounted on this pin 60 are provided with pins 63 and 64, respectively, which engage the short arms of the bell cranks and transmit motion from them to the sleeves. The compression springs 65 and 66 are mounted on the pin 60 between the sleeves 61 and 62 and the end portions of the pin, so that the outward swinging of the short arms of the bell cranks will result in compression of the springs. By tightening up the nut 67 on one end of the pin 60, it is possible to place the springs under whatever compression it may be desired.

It will be observed that, with this arrangement, the load carried by the saddle 52 is passed by way of the pin 55 onto the bell cranks, the outer ends of whose long arms are supported by the crawler frames. The downward thrust on the pin 55 will tend to rock the bell cranks with respect to each other, thereby also tending to separate the sleeves 61 and 62, which separation, however, is resisted by compression of the springs 65 and 66. In this way the loads are equalized on the two sides of the machine, and the amount of load which will be carried by the saddle can be increased or diminished by proper manipulation of the nut 67.

In order to minimize wear and tear as much as possible, the end portions 56 and 57 of the bell crank arms are permitted to rest on ball supports 68 carried in the sockets 69 which, in turn, are mounted on the crawler frame bars.

In turning a curve, means should be provided for swinging the forward portions of the crawler so as to keep the crawler frames in line without throwing too much of a burden on the rear axle 41. For this purpose, I have shown the yokes 70 and 71 extending sidewise from the saddle 52, said yokes being provided with the vertical guideways 72 and 73, respectively. The brackets 74 and 75 are connected to the crawler frame bars, said brackets carrying rollers 76 and 77 which work within the slots or guides 72 and 73.

Any suitable form of gear shifting and transmission arrangement may be used for delivering power to the crawler chains, and, consequently, I do not limit myself to any particular form for the construction of these parts except as I may do so in the claims. I have already mentioned that, in many cases, it may be very difficult to control the operation of a machine of this kind entirely in turning the curve, if sole reliance is placed upon the use of the front steering wheels. In this connection I have explained that the steering functions may be improved in many cases by making provision for independently controlling or modifying the speeds of the crawlers so as to thereby produce a turning effort in the very act of driving the machine. I, therefore, have in this present specification and drawings disclosed a detailed construction of transmission mechanism and associated parts, whereby the driving of the crawlers may be independently controlled for the foregoing purpose, which construction I will now explain. It is to be understood, however, in this connection, that this particular construction is illustrated and described simply by way of giving a convenient example of a construction which will accomplish the results desired.

The wheels 42 for the two crawlers are driven in any convenient manner, but a simple form of construction will be one in which each of these wheels is provided on its inner face with an annular gear which may be driven by a pinion. The pinions 78 and 79 of Fig. 7 are these pinions, and it is to be understood that they drive the crawler wheels 42 in any suitable manner. These pinions are mounted upon the differential shaft sections 80 and 81 which are suitably journaled within the transmission box as by means of the roller bearings 82 and 83. The inner ends of the shaft sections 80 and 81 are drivingly connected to the beveled gears 84 and 85, as by means of the squared connections 86 and 87, shown in Fig. 7.

A differential box 88 is journaled on the end portions of the shaft sections, said journaling being effected by the necks 89 and 90. On its interior, this differential box carries the pinions 91 and 92 mounted on the pins 93 and 94, so that by rotating the differential box, the shaft sections 80 and 81 will be differentially driven in a manner which is well understood in this art.

The differential box is provided on its exterior with a ring gear 95 which is always in mesh with a pinion 96 mounted on a jack shaft 97. This jack shaft is journaled in the transmission box and carries the low speed gear 98 and the high speed gear 99.

In the lower portion of the transmission box is a reversing shaft 100, which carries a pinion 101 always in mesh with the low speed gear 98, and a gear 102 by means of which the pinion 101 may be driven during the reversing operation.

A control shaft 103 is journaled in the upper portion of the transmission casing as by means of the roller bearings 104 and 105. This control shaft is driven from the engine shaft 106 through the medium of the beveled gear 107 and the beveled pinion 108, the shaft 106 being journaled in the roller bearing 109. A low speed pinion 110 is splined onto the control shaft 103, and normally stands in the central position shown in Fig.

7. By moving this pinion to the left or lower portion of Fig. 7, it will mesh directly with the low speed gear 98 to drive in the forward direction at low speed. By moving it to the right or upwardly in Fig. 7, it will mesh with the reversing gear 102, thereby driving the low speed 98 through the medium of the gears 102 and 101 in the reverse direction and at low speed. The high speed pinion 111 is splined to the control shaft 103 or to a sleeve 112 connected to the beveled gear 107 and it normally stands in the position shown in Fig. 7. By moving it to the left or downwardly in Fig. 7, it will mesh with the high speed gear 99 so as to drive at high speed in the forward direction.

The foregoing arrangement of gears permits of two speeds forward and one speed reversed which is sufficient for purposes of a machine of this kind. Any suitable means may be used for shifting the pinions 110 and 111. A convenient shifting means includes the use of the gear shift lever 113 shown in Figs. 1, 2, 3 and 4. However, in view of the fact that gear shifting devices are well known and understood in the art, I will not further explain in detail the connections between this gear shift lever and the pinions 110 and 111.

Mounted on the shaft sections 80 and 81 are the brake drums 114 and 115, respectively. A brake band 116 surrounds each of these drums, its central portion being locked against rotation by means of a fixed pin 117, and its end portions being connected together by a toggle connection 118 under control of the brake bar or rod 119. The brake bars or rods 119 for the two brake bands are connected to the pedals 120 and 121, respectively, so that the operator by pressing his foot against either of these pedals can slow down or lock the corresponding crawler.

The transmission box is provided in its upper portion with a port hole or opening 122 through which access is gained to the gearing and shifting mechanism. Ordinarily this port hole is closed by a plate which is bolted or otherwise secured to the transmission casing. However, in some cases, it may be desirable to use the machine for driving a pulley to which may be connected a belt or the like for running an agricultural implement. For this purpose, I have shown in Fig. 8 a removable casing section 123, within which is journaled a gear 124 which, when the casing 123 is set down over the port hole, will mesh with one of the pinions on the control shaft 103. For example, it may mesh with the pinion 111 when said pinion stands in the off position shown in Fig. 7. The gear 124 also meshes with a pinion 125 on a pulley shaft 126 on which is mounted the belt pulley. I will not explain the construction of mechanism for operating the clutch beyond mentioning the fact that the foot pedal 127 serves to disengage the clutch when it is forced inwardly.

I wish to lay particular emphasis upon the following features: First, the fact that the wheels 24 and 25 are set at a greater gauge distance than the crawlers 24$^a$ and 25$^a$, so that one or the other of the wheels may be allowed to track in the previously turned furrow while both of the crawlers are riding on the unplowed land. Secondly, the fact that the crawlers may be differentially controlled by the operator so as to facilitate and improve the turning functions.

While I have herein shown and described only a single embodiment of my invention, still it will be understood that I do not limit myself to the said embodiment, except as I may do so in the claims.

I claim:

1. In a machine of the class described, the combination with a suitable framework and a prime mover thereon, of a pair of longitudinally extending driving crawlers operatively mounted in the rear portion of the framework, independently controllable driving connections to both of said crawlers from the prime mover, whereby the direction and speed of said crawlers may be independently controlled, and a pair of steering wheels journaled in the front portion of the machine and means for turning both of said wheels simultaneously in the steering function, said steering wheels being located a greater distance apart than the gauge of the crawlers, and both of the steering wheels traveling outside of the paths of travel of the crawlers, whereby one of the steering wheels may travel in a previously cut furrow while both of the crawlers travel on unplowed land, and whereby the crawlers and both of the steering wheels may be simultaneously used in the steering function, substantially as described.

2. In a machine of the class described, the combination with a suitable framework and a prime mover thereon, of a pair of longitudinally extending driving crawlers operatively mounted in the rear portion of the framework, independently controllable driving connections to both of said crawlers from the prime mover, whereby the direction and speed of said crawlers may be independently controlled, and a pair of steering wheels journaled in the front portion of the machine and means for turning both of said wheels simultaneously in the steering function, said steering wheels being located a greater distance apart than the gauge of the crawlers, whereby one of the steering wheels may travel in a previously cut furrow while both of the crawlers travel on unplowed land, and whereby the crawlers and both of the steering wheels may be simultaneously used in the steering function, substantially as described.

3. In a vehicle, the combination with a suitable framework, of a prime mover located in the front portion thereof, a pair of driving sprocket wheels journaled in the rear portion of the frame, a forwardly extending arm on each side of the machine, connected with the main frame in a manner to permit rocking movement, a pulley journaled to the front end of each arm, a crawler chain traveling over each sprocket and the corresponding pulley, and means for transmitting weight from the frame of the machine to the forward portion of each arm, including a pair of bell-crank levers pivoted on the frame and having their end portions carried by the arms aforesaid, and a spring connection between the other end portions of the bell-crank levers tending to rock said levers to depress their end portions aforesaid.

HARRY H. BATES.